(12) United States Patent
Higgins

(10) Patent No.: US 6,438,546 B1
(45) Date of Patent: Aug. 20, 2002

(54) METHOD OF STANDARDIZING ADDRESS DATA

(75) Inventor: Brenda R. Higgins, Aurora, IL (US)

(73) Assignee: Pitney Bowes, Inc., Stamford, CT (US)

( * ) Notice: Subject to any disclaimer, the term of this patent is extended or adjusted under 35 U.S.C. 154(b) by 0 days.

(21) Appl. No.: 09/350,595

(22) Filed: Jul. 9, 1999

(51) Int. Cl.[7] .............................................. G06F 17/30
(52) U.S. Cl. .......................... 707/6; 707/100; 707/101; 707/102; 707/3
(58) Field of Search ................................. 707/101, 102, 707/3, 6, 100, 5, 522, 531; 704/10, 243, 3, 9, 270; 711/108, 216

(56) References Cited

U.S. PATENT DOCUMENTS

| 5,287,275 A | * | 2/1994 | Kimura ................. 364/419.01 |
| 5,600,827 A | | 2/1997 | Nakabayashi et al. ...... 395/602 |
| 5,625,465 A | | 4/1997 | Lech et al. ................. 358/448 |
| 5,628,004 A | | 5/1997 | Gormley et al. ............ 395/615 |
| 5,669,007 A | * | 9/1997 | Tateishi ...................... 395/779 |
| 5,966,695 A | * | 10/1999 | Melchione et al. ........... 705/10 |
| 5,978,769 A | * | 11/1999 | Brown et al. .................. 705/4 |
| 6,185,560 B1 | * | 2/2001 | Young et al. .................. 707/6 |

* cited by examiner

Primary Examiner—Jean M. Corrielus

(57) ABSTRACT

A method of standardizing address data in a database using a word dictionary and a pattern dictionary. The method includes the steps of a) breaking up a set of address data into lines; b) breaking up each line into words; c) looking up each word in the word dictionary for identifying the field type of the word; d) forming a line pattern from the field type of the words in the line; e) looking up the line pattern in the pattern dictionary; and f) returning a line pattern to each of the lines in the address data. With each word in each line in a set of address data having a field type assigned thereto, the address components can be easily identified by a machine reading the address data. With the standardized address data, for example, a machine can identify which component of an address is the street name, and which component of a name line is the title of the addressee.

6 Claims, 2 Drawing Sheets

METHOD OF STANDARDIZING ADDRESS DATA

TECHNICAL FIELD

The present invention relates to a method for the standardization of a database containing address data relevant to individuals and businesses.

BACKGROUND OF THE INVENTION

In a business that has a customer database for mass mailing or other address related applications, it is advantageous to have all the address data in the database standardized. In a standardized address database, an address can be organized in a certain way so that the various components of the address data can be easily identified by a machine. There are many instances where an address must be broken down into different components so that each component is used in a different way. For example, if it is required to fill out a form where only the last name, the city name and the zipcode are separately put in different boxes of the form, one could use a machine to pick out the correct components in a standardized address and put them in the proper places. Moreover, using a standardized address database, address duplication can be easily discovered and eliminated.

Standardized address database can be used by private institutions such as banks, insurance companies, credit bureaus, hospitals, fund raising organizations, and mail-order businesses. The database are also useful for various government agencies such as the Social Security Administration, Internal Revenue Service, and so forth.

It is advantageous to provide a method for the standardization of address data.

SUMMARY OF THE INVENTION

It is the primary objective of the present invention to provide an effective method to standardize the address data in a database.

The basic steps for accomplishing the above-identified objective begin with breaking up (parsing) a set of address data into lines and then breaking up each line into words. Each word is looked up in a word dictionary wherein the word dictionary has a large quantity of stored words and each stored word is associated with a field type. The field type of each word is identified by comparing the word in the line to the stored words in the word dictionary. After the field types are identified, a line pattern is formed for each line using the field types of the words in the line. A pattern type is then identified for each line by comparing the pattern of the line to the stored patterns contained in a pattern dictionary. The line patterns for each line are then returned to the address data.

In some instances when a line pattern cannot be found in the pattern dictionary, it is necessary to include an additional step of splitting the line into two. For example, in a line that contains both the street address and the P.O. Box number, it is preferable to break up the line into a street address line and a P.O. Box line.

In some instances when a line pattern cannot be found in the pattern dictionary, it is necessary to include an additional step of joining two lines into one. For example, when the City/State/Zip line has been broken up such that the Zipcode is separated from the city name and state name, it is preferable to put the Zipcode behind the state name on the same line.

In some instances when a line pattern cannot be found in the pattern dictionary, it is necessary to include an additional step of dropping one or more words in a line. For example, in a personal name line containing financial words such as "Trustee", "Deceased", "Minor", and/or "Retiree", it is preferable to delete those words in the address data.

It is also preferred that the dictionary contains words that are considered standard in an address and those are non-standard, so that the non-standard words in an address can be identified and then replaced by the standard words. For example, it is preferable to include in the word dictionary the full state names (e.g. New Mexico) as well as the abbreviated state names (e.g. NM) for identification purposes, but the full state names will be replaced by the corresponding abbreviated state names in the standardized address database.

When a set of address data is broken up into lines, it is preferable to discern the line type. For example, it is preferable to know whether a line is a street address line or a firm name line. Accordingly, the field types of the stored words in the word dictionary are assigned in accordance with the line types. For line identification purposes, a procedure called Blockscan is used. The Blockscan procedure starts from the bottom line of an address and works upward until the topmost line has been identified, and each line is identified using the usual address queues appearing in the line. For example, if the bottom line contains a state name as the second or a later word, the line is identified as a city state line. In the next line up, if there is a street suffix word such as Ave., Avenue, and Blvd. in the line, the line is identified as a street address line. Similarly, if a word that is commonly used as part of a firm name, such as CO, Company, Inc., Industry, appears in a line above the street address, the line is identified as a firm line.

The present invention is more clearly described in the Detailed Description of the Embodiment.

DETAILED DESCRIPTION

Figure 1:
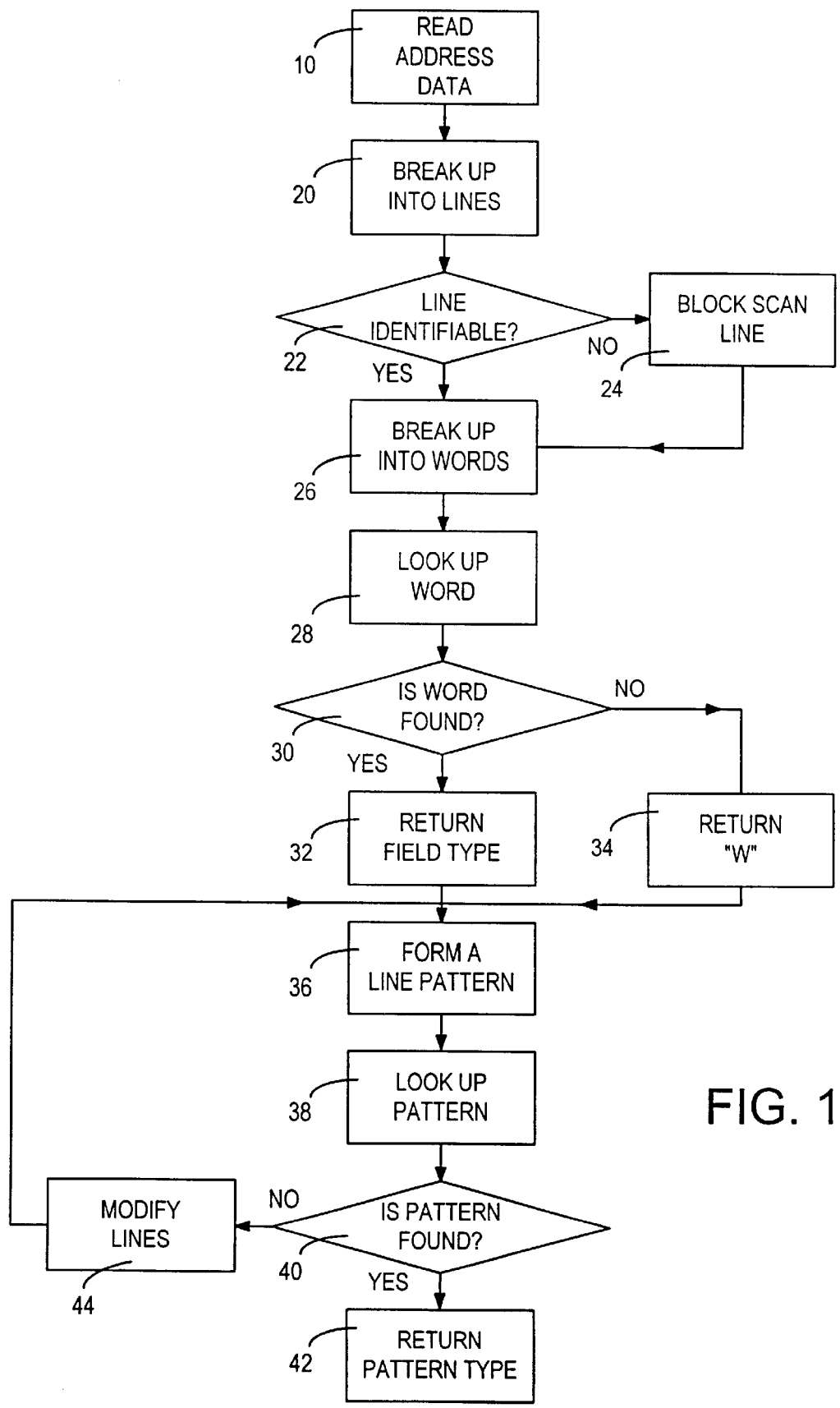
FIG. 1 illustrates the flowchart of the overall standardization procedure.

FIG. 1 illustrates the flowchart of the overall procedure for the standardization of address data. As shown in the flow chart, the standardization procedure includes the following steps:

1) reading a set of address data (10);
2) breaking up the address data into lines (20);
3) identifying the data type of each line (22). If lines are not identifiable, use the Blockscan procedure (24);
4) breaking up each line into words (26);
5) looking up words in a word dictionary (28). If a word can be found in the word dictionary, return the field type of the word (32). Otherwise return a "W" (34);
6) using the field types to form a line pattern (36);
7) looking up the line pattern in a pattern dictionary (38);
8) returning a pattern type if a pattern in found (42). Otherwise modify lines (44) and repeat Step 6.

When the standardization procedure is completed, each of the lines in a set of standardized address data will have a line pattern formed from the field types. The field types are identifiable by a machine or a human operator.

It should be noted that the line modification step (44) may include the step of joining two or more lines into one, or splitting one line into two or more lines, or eliminating certain non-essential words in a line. Moreover, the address data standardization procedure may also include the step of substituting non-standard words with standard words.

To illustrate the address data standardization process, according to the present invention, the following set of fictitious address data is used as an example:

Professor and Mrs. Thomas X Johnson
Samuel Connaly, Jr., Esq.
c/o Quimby Imaging Technology, Inc.
123 S. Cross River Pkwy, N.E.
Ste 203-B
East Carrolton, Ga. 31072-0124

A) Breaking up data into lines

An address isolator, according to present invention, is used to break up the address data into lines. The address isolater handles up to eight Name and Address Lines, for example, and each line is identified by a type, as shown below:

| | |
|---|---|
| N1 | Personal Name 1 |
| N2 | Personal Name 2 |
| N3 | Personal Name 3 |
| F1 | Firm/Company |
| A1 | Primary Address |
| A2 | Alternate Address |
| L1 | Last Line/City |
| S | Scan data which is an unidentifiable input line |

With the address example given above, the lines are identified as:

| | |
|---|---|
| N1 | Professor and Mrs. Thomas X Johnson |
| N2 | Samuel Connaly, Jr., Esq. |
| F1 | c/o Quimby Imaging Technology, Inc. |
| A1 | 123 S. Cross River Pkwy, N.E. |
| A2 | Ste 203-B |
| L1 | East Carrolton, Georgia 31072-0124 |

B) breaking up each line into words

| | |
|---|---|
| N1: | Professor |
| | and |
| | Mrs |
| | Thomas |
| | X |
| | Johnson |
| N2: | Samuel |
| | Connaly |
| | Jr |
| | Esq |
| F1: | c/o |
| | Quimby |
| | Imaging |
| | Technology |
| | Inc |
| A1: | 123 |
| | S |
| | Cross |
| | River |
| | Pkwy |
| | N.E. |
| A2: | Ste |
| | 203-B |
| L1: | East |
| | Carrolton |
| | Georgia |
| | 31072 |
| | 0124 |

C) Looking up words in a word dictionary

The word dictionary, according to the present invention, is used to identify the characteristics of the words, and the characteristics are represented by field types or values. For example, there are 20 type of words, represented by:

| Value | Type | Examples |
|---|---|---|
| T | State word | California, CA, D.C., WI |
| U | Unit designator word | Apt., Suite, Ste |
| R | Rural route | RR, Hwy |
| H | Highway Contract | HC |
| M | Military word | CMR, PSC |
| P | PO Box word | P.O. Box, Box, POBOX |
| S | Street suffix word | Ave, Avenue, Bvld, Pkwy |
| D | Street direction word | East, E., N.W. |
| C | Care of word | c/o |
| O | Numeric data spelt word | Twenty, One |
| N | Numeric street word | 5th, 22nd |
| + | Conjunction word | and, &, OR |
| I | Ignored word | BLOCK, BLOQUE (Puerto Rico only) |
| F | Firm word | Co, Company, Ltd, LLC |
| 1 | Personal name | Johnson, Mary |
| B | Financial Words | Trustee, Deceased |
| M | Multiple meaning word | St (street or saint) |
| 2 | Concatenating word | La, Des, Las |
| 3 | Personal name prefix | Ms, Dr, Prof, Professor |
| 4 | Personal name suffix | Jr, Sr, III, Esq, Ph.D., MD |
| W | word not found in dictionary | |

In the above example, the values of the words are returned as follows:

| Type | Word | Value |
|---|---|---|
| N1: | | |
| Title 1 | Professor | 3 |
| Ignored | and | + |
| Title 2 | Mrs | 3 |
| First Name | Thomas | 1 |
| Middle Name | X | W |
| Surname 1 | Johnson | 1 |
| Surname 2 | — | |
| Suffix 1 | — | |
| Suffix 2 | — | |
| N2: | | |
| Title 1 | — | |
| Title 2 | — | |
| First Name | Samuel | 1 |
| Middle Name | — | |
| Surname 1 | Connaly | 1 |
| Surname 2 | — | |
| Suffix 1 | Jr | 4 |
| Suffix 2 | Esq | 4 |

It should be noted that, in the Personal Name lines, Surname 2 is the name after the hyphen in a hyphenated surname. For example, in Mrs. Stella Lee-Guggenheim, Guggenheim is categorized as Surname 2.

| Type | Word | Value |
|---|---|---|
| F1: | | |
| Care of | c/o | C |
| Firm name | Quimby | W |
| Firm name | Imaging | W |
| Firm name | Technology | W |
| Firm name | Inc | F |

It should be noted that the breaking up of a Firm Name line is for identification purposes only. The line is broken up so that the words can be checked against a group of firm name words such as Co, Company, LLC, LLP, LTD, Inc., etc., but it is not necessary to use the word types to form a line pattern.

| Type | Word | Value |
|---|---|---|
| A1: | | |
| Range | 123 | N |
| Pre-Dir. | S | D |
| Street Name | Cross | W |
| Street Name | River | W |
| Street Suffix | Pkwy | S |
| Post-Dir. | N.E. | D |
| A2: | | |
| Unit Name | Ste | U |
| Unit Number | 203-B | N |
| Box Type | — | |
| Route Number | — | |
| Box Number | — | |
| L1: | | |
| City Name | East | W |
| City Name | Carrolton | W |
| State Code | Georgia | T |
| Zip Code | 31072 | N |
| Plus4 | 0124 | N |

D) Identifying the word Pattern in each line L

| Line | Line pattern |
|---|---|
| N1: | 331W1 |
| N2 | 1144 |
| F1 | — |
| A1 | NDWWSD |
| A2 | UN |
| L1 | WWTNN |

It should be noted that the ignored words (type 1) have been dropped from the line patterns.

E) standardizing address data

In this example, the word pattern in line N1 can be considered non-standard because it contains two titles: Professor and Mrs. It is preferred that the address is rearranged to become:

| N1 | T1W1 | Professor Thomas X Johnson |
|---|---|---|
| N2 | T1W1 | Mrs. Thomas X Johnson |
| N3 | 11TT | Samuel Connaly, Jr., Esq. |
| F1 | — | Quimby Imaging Technology, Inc. |

-continued

| A1 | NDWWS | 123 S. Cross River Pkwy, N.E. |
|---|---|---|
| A2 | UN | Suite 203-B |
| L1 | WWTNN | East Carrolton, GA 31072-1024 |

The splitting of the original N1 line to N1 and N2 is called dual-name isolation. Another example of dual-name isolation is to separate the name line of Jane and John Smith into Jane Smith and John Smith. In the last line of the above example, the word "ste" has been replaced by "Suite", and the full state name "Georgia" has been replaced by the abbreviated state name "GA".

With the standardized address, it is quite straightforward for a machine to pick out the correct address components based on the values, when required. For example, the city name "East Carrolton" is easily identified by the fact that the city state line has a line pattern of WWTNN, where T is the value of a state name.

Figure 2:
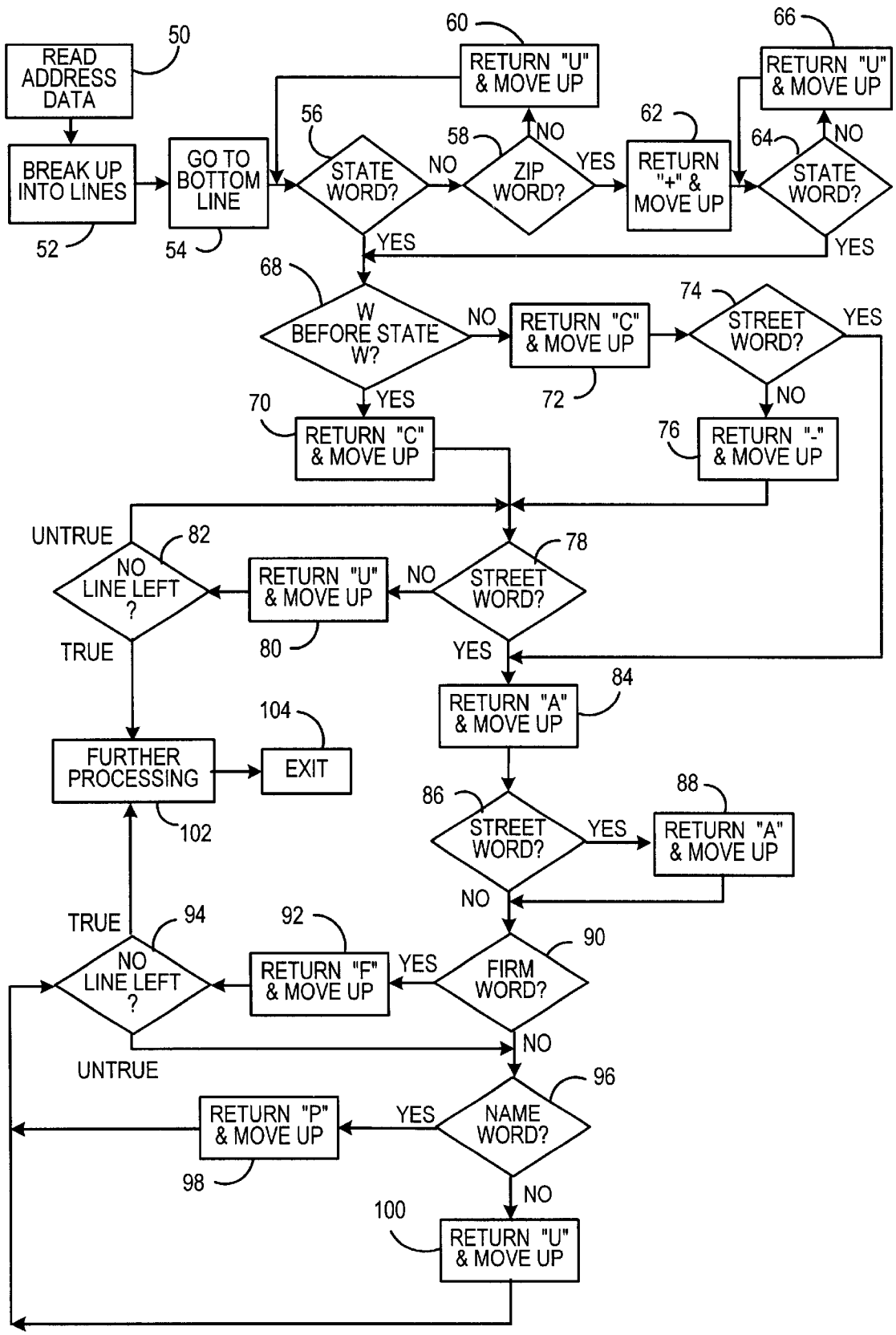
FIG. 2 illustrates the flowchart of the Blockscan procedure

FIG. 2 illustrates the flowchart of the Blockscan procedure. The Blockscan procedure is used to identify the type of a scanned line in order to indicate whether a line is a Name line, an Address line, etc. The line types are represented by the following values:

| A | Address line |
|---|---|
| F | Firm line |
| P | Personal name line |
| C | City state line |
| + | To be concatenated with the line above |
| - | To be concatenated with the line below |
| U | Unknown line |

As shown in the flowchart in FIG. 2, the Blockscan procedure includes the following steps:
 1) reading a set of address data (50);
 2) breaking up the address data into lines (52);
 3) going to the bottom data line (54);
 4) looking for a state word (56);
   If a state word is found, go to Step 5;
   If not, look for a zip word (58);
     If a zip word is not found, return a "U" and move up a line (60), and repeat Step 4;
     If a zip word is found, return a "+" and move up a line (62), then look for a state word in the new line (64);
     If a state word is found in the new line, go to Step 5;
     If not, return a "U" and move up a line (66), and look for a state word in the new line again (64);
 5) looking for words before the state word in the same line (68);
   If one or more words are found, assume they are city name and go to Step 6;
   If no word is found, return a "C" and move up a line (72), then look for a street word in the new line (74);
     If a street word is found, assume state name is located on the street address line and go to Step 8;
     If a street word is not found, return a "−" and move up a line (76), then go to Step 7;
 6) returning a "C" and move up a line (70);
 7) looking for a street word in the new line (78);
   If a street word is found, go to Step 8;
   If a street word is not found, then return a "U" and move up a line (80);

If no more new lines, go to Step 12;
Otherwise go back to Step 7;
8) returning an "A" and move up a line (84);
9) looking for a street word again (86);
If a street word is found, return an "A" and move up a line (88), then go to Step 10;
If a street word is not found, go to Step 10;
10) looking for a firm word (90);
If a firm word is found, return an "F" and move up a line (92);
If no more new lines, go to Step 12;
Otherwise go to Step 11;
11) looking for a name word (96);
If a name word is found, return a "P" and move up a line (98);
If no more new lines, go to Step 12;
Otherwise go back to Step 11;
If a name word is not found, return a "U" and move up a line (100);
If no more new lines, go to Step 12;
Otherwise go back to Step 11;
12) concatenating lines with either "+" or "−" to another line.

| Value | Scanned line | Processes |
|---|---|---|
| Example 1: | | |
| A | 123 Main Street | (78, yes) |
| − | Westfield | (74, no) |
| C | NJ | (64, yes; 68, no) |
| + | 07090 | (56, no; 58, yes) |
| Example 2: | | |
| A | 123 Main Street | (78, yes) |
| C | Westfield, NJ | (64, yes; 68, yes) |
| + | 07090 | (56, no; 58, yes) |
| Example 3: | | |
| A | 123 Main Street | (78, yes) |
| − | Westfield | (74, no) |
| C | NJ 07090 | (56,yes; 68, no) |
| Example 4: | | |
| A | 123 Main Street | (78, yes) |
| C | Westfield, NJ 07090 | (56, yes; 68, yes) |

The lines in Examples 1–3 will be concatenated, in Step 12, to become the address lines of Example 4. It should be noted that the flowchart shown in FIG. 2 is for illustrative purposes only. It is used to demonstrate the principle of the Blockscan procedure for identifying the line type of each line in an address. The procedure can be varied to include more steps or to skip some steps. For example, according to the flowchart in FIG. 2, the street word is checked only on two lines in Step 7 and Step 5, and the firm word is checked only on one line in Step 10. However, more lines can be checked for street words and firm words if desired. Moreover, when a certain word type is not found in a line, more criteria can be used to identify the line before returning a "U" to it, such as the process (66) of finding a street word. Furthermore, the Blockscan procedure and address standardization procedure can also include the additional step of identifying the country name. The same procedures can be modified for standardizing the address data written in other languages.

Although the invention has been described with respect to a preferred process and version thereof, it will be understood by those skilled in the art that the foregoing and various other changes, omissions and deviations in the form and detail thereof may be made without depart from the spirit and scope of this invention.

What is claimed is:

1. A method of standardizing address data for preparing mail using a first reference source having a plurality of stored words, each stored word having a field type assigned thereto, and a second reference source having a plurality of stored patterns, each of said stored patterns having a pattern type, said method comprising the steps of:

(a) breaking up said address data into data lines;
   (b) breaking up each data line into a plurality of data words;
   (c) identifying the field type of each data word by comparing each data word to the stored words in the first reference source;
   (d) forming a line pattern with the field types obtained in Step (c) for all data words in each data line;
   (e) identifying the pattern type of each data line by comparing the line pattern of each data line to the stored patterns in the second reference source.

2. The method of claim 1 further comprising the step of breaking a data line into a plurality of data lines.

3. The method of claim 1 further comprising the step of joining a plurality of data lines into one data line.

4. The method of claim 1 further comprising the step of eliminating one or more data words from a data line.

5. The method of claim 1, wherein the stored words include non-standard words and corresponding standard words, said method further comprising the step of substituting a data word with a standard word if said data word is a non-standard word.

6. The method of claim 1, wherein the stored words are classified into a plurality of line types and the field types of the stored words are assigned in accordance with the line types, said method further comprising the step of identifying the line type of each of the data lines.

* * * * *